US008803567B2

(12) United States Patent
Quan et al.

(10) Patent No.: US 8,803,567 B2
(45) Date of Patent: Aug. 12, 2014

(54) FREQUENCY MULTIPLIER SYSTEM AND METHOD OF MULTIPLYING FREQUENCY

(75) Inventors: Yong Quan, Chengdu (CN); Guosheng Wu, Chengdu (CN)

(73) Assignee: IPGoal Microelectronics (SiChuan) Co., Ltd., Chengdu, Sichuan (CN)

( * ) Notice: Subject to any disclaimer, the term of this patent is extended or adjusted under 35 U.S.C. 154(b) by 294 days.

(21) Appl. No.: 13/208,346

(22) Filed: Aug. 12, 2011

(65) Prior Publication Data

US 2012/0038395 A1 Feb. 16, 2012

(30) Foreign Application Priority Data

Aug. 12, 2010 (CN) .......................... 2010 1 0251857

(51) Int. Cl.
*H03B 19/00* (2006.01)

(52) U.S. Cl.
USPC .......................................... 327/116; 327/119

(58) Field of Classification Search
CPC ................ H04L 1/20; H04L 25/03057; H04L 25/03343; H04L 12/2801; H04L 1/0003; H04L 1/0009; H04L 1/0061; H04L 2025/03808; H04L 27/2601; H04L 27/34; H04B 1/1036; H04J 3/0682; H04J 3/0655; H03L 7/07
USPC ......... 327/359, 356, 113, 121, 100, 355, 231, 327/357, 116–120, 235, 246, 247; 455/317, 455/323, 318, 313, 561, 550.1, 333, 575.1, 455/424, 425, 456.5, 456.6, 20, 22, 209, 455/258, 255, 273, 276.1, 63.1, 501, 67.13, 455/86, 67, 11, 91, 112, 207, 302, 285, 296, 455/114.4, 114.2, 118, 131, 189.1, 190.1, 455/283, 295; 375/308, 329, 284, 285, 296; 329/304–306
See application file for complete search history.

(56) References Cited

U.S. PATENT DOCUMENTS 7,187,917 B2 * 3/2007 Lin et al. ....................... 455/323

* cited by examiner

*Primary Examiner* — Lincoln Donovan
*Assistant Examiner* — Diana J Cheng

(57) ABSTRACT

A frequency multiplier system, for outputting a single phase clock of N multiplied frequency after processing an inputted clock, N≥2, includes a frequency divider receiving the inputted clock, an interpolator connected with the frequency divider, a phase equalizer connected with the interpolator, and a combinational logic circuit connected with the phase equalizer, wherein the frequency divider outputs an orthogonal clock having a two-phases frequency that is a half of the inputted clock to the interpolator, the interpolator outputs a 2N-phases clock to the phase equalizer, the phase equalizer homogenizes a phase skew of the 2N-phases clock, the combinational logic circuit synthesizes the homogenized 2N-phases clock into a single phase clock of N multiplied frequency. And a method of multiplying frequency is provided. The present invention does not need feedback circuits, and therefore is stable and fast-speed, saves area, and reduces energy consumption.

9 Claims, 3 Drawing Sheets

… (2N−1)Π/2N degrees. The

FREQUENCY MULTIPLIER SYSTEM AND METHOD OF MULTIPLYING FREQUENCY

BACKGROUND OF THE PRESENT INVENTION

1. Field of Invention

The present invention relates to an electrical system, and more particularly to a frequency multiplier system and a method of multiplying frequency, which is capable of obtaining high frequency clocks, stable and fast-speed.

2. Description of Related Arts

In particular application, resonance frequency of crystal oscillator may be lower than requirement of application. Therefore, to obtain a high frequency clock, a frequency multiplier circuit is needed.

Conventional frequency multiplier circuits are realized through phase-locked loops, but due to existing of filter circuits, ordinary frequency multiplier circuits have large surface area and high energy consumption. Realizing frequency multiplier circuits with multiple phases composite technology of delay lines also needs feedback locking and filter circuits, and has worse effect than the phase-locked loops. Therefore, it is necessary to provide a frequency multiplier system and a method of multiplying frequency, which is capable of obtaining high frequency clocks, stable, fast-speeded, and area-saving.

SUMMARY OF THE PRESENT INVENTION

An object of the present invention is to provide a frequency multiplier system and a method of multiplying frequency, which is capable of obtaining high frequency clocks, stable, fast-speed, and area-saving.

Accordingly, in order to accomplish the above objects, the present invention provides a frequency multiplier system, for outputting a single phase clock of N multiplied frequency after processing an inputted clock, N≥2, comprising a frequency divider receiving the inputted clock, an interpolator connected with the frequency divider, a phase equalizer connected with the interpolator, and a combinational logic circuit connected with the phase equalizer, wherein the frequency divider outputs an orthogonal clock having a two-phases frequency that is a half of the inputted clock to the interpolator, the interpolator outputs a 2N-phases clock to the phase equalizer, the phase equalizer homogenizes a phase skew of the 2N-phases clock, the combinational logic circuit synthesizes the homogenized 2N-phases clock into a single phase clock of N multiplied frequency.

A method of multiplying frequency, comprising the following steps:

receiving an inputted clock, and outputting an orthogonal clock having a two-phases frequency that is a half of the inputted clock to an interpolator by a frequency divider;

outputting a 2N-phases clock to a phase equalizer by the interpolator, N≥2;

homogenizing a phase skew of the 2N-phases clock, and outputting to a combinational logic circuit by the phase equalizer; and synthesizing the homogenized 2N-phases clock into a single phase clock of N multiplied frequency by the combinational logic circuit.

As comparing to the prior art, the frequency multiplier system and the method of multiplying frequency according to the present invention does not need a feedback circuit, thus rendering the frequency multiplier system stable, fast-speed, area-saving and energy-reducing.

These and other objectives, features, and advantages of the present invention will become apparent from the following detailed description, the accompanying drawings, and the appended claims.

DETAILED DESCRIPTION OF THE PREFERRED EMBODIMENT

Figure 1:
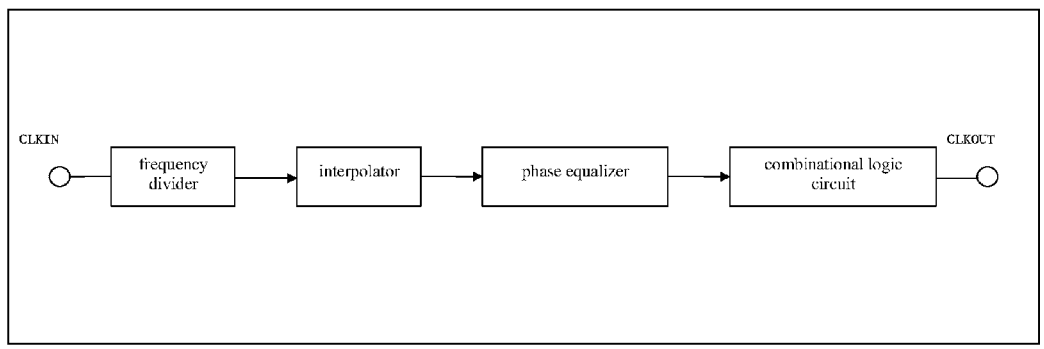
FIG. 1 is a systematic block diagram of a frequency multiplier system according to a preferred embodiment of the present invention.

Referring to FIG. 1 of the drawings, a frequency multiplier system according to a preferred embodiment of the present invention is illustrated, comprising: a clock signal input end CLKIN, a frequency divider connected with the clock signal input end CLKIN, an interpolator connected with the frequency divider, a phase equalizer connected with the interpolator, a combinational logic circuit connected with the phase equalizer, and a clock signal output end CLKOUT connected with the combinational logic circuit.

The frequency divider is for obtaining a two-phases orthogonal clock having a frequency that is a half of an inputted clock, i.e., a clock having phases of 0 degree and 90 degrees. The interpolator is for obtaining a 2N-phases clock which is necessary to synthesizing phases, wherein N means to obtain a clock of N multiplied frequency, N≥2. The 2N-phases clock has phases of 0 degree, Π/2N degrees, 2Π/2N degrees, 3Π/2N degrees … (2N−1)Π/2N degrees. The phase equalizer is for optimizing relative time delay of clocks of different phases in a multiple phases clock outputted by the interpolator, i.e., homogenizing a phase skew of the clocks of different phases, in such a manner that the relative time delay of clocks of different phases maintains consistent. The combinational logic circuit utilizes symmetrical logic circuit structure, for converting and synthesizing the multiple phases clock into a single phase clock of N multiplied frequency.

Figure 2:
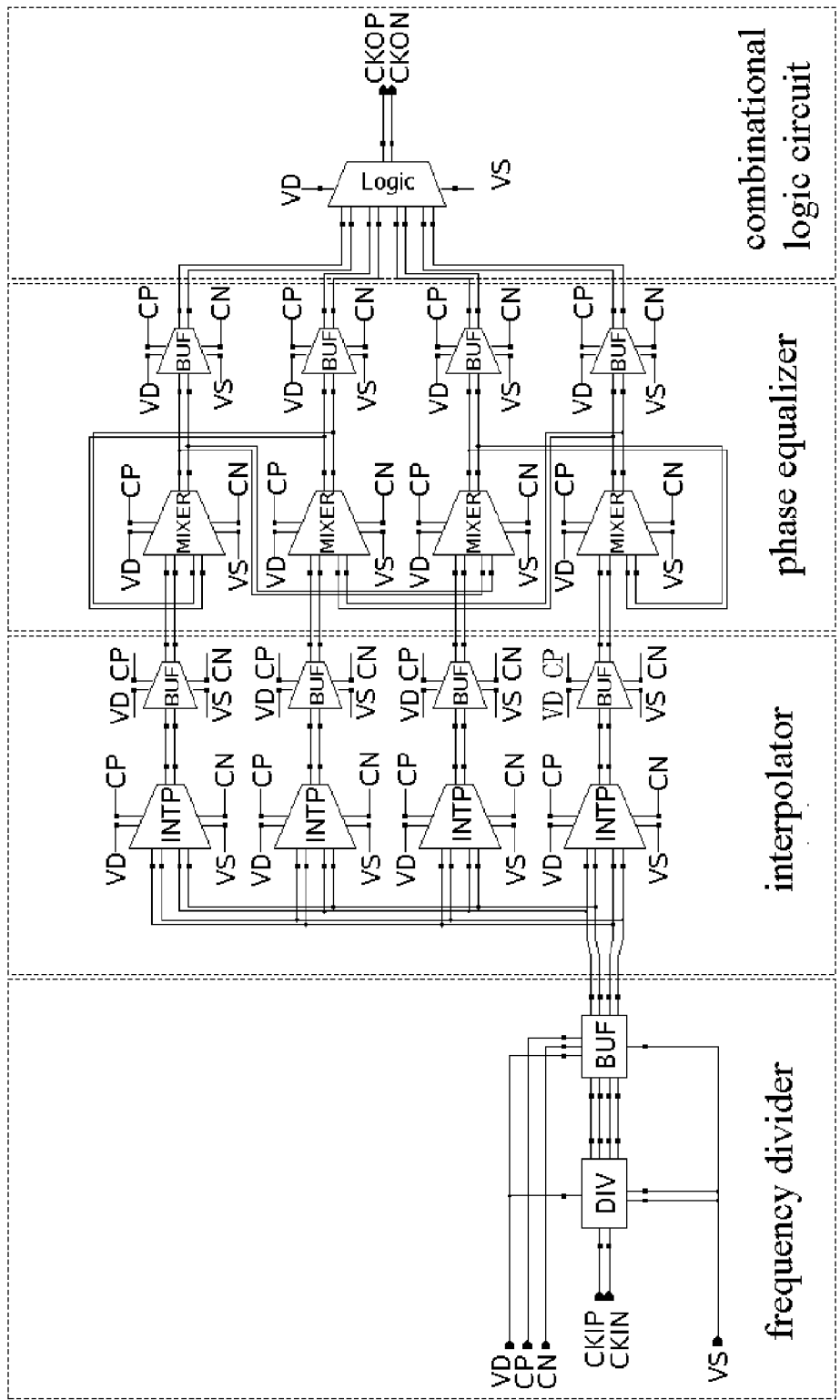
FIG. 2 is a circuit diagram of the frequency multiplier system according to the preferred embodiment of the present invention.

Referring to FIG. 2 of the drawings, FIG. 2 is a circuit diagram of the frequency multiplier system according to the preferred embodiment of the present invention. The clock signal input end CLKIN comprises a pair of differential clock signal ends CKIP and CKIN. The clock signal output end CLKOUT comprises a pair of differential clock signal output ends CKOP and CKON. The frequency divider comprises a frequency dividing unit DIV connected with the pair of differential clock signal ends CKIP and CKIN, and a buffer BUF connected with the frequency dividing unit DIV. An electrical source end of the frequency dividing unit DIV and an electrical source end of the buffer BUF are both connected with an electrical source signal end VD. Two ends of the buffer BUF are connected with a pair of biasing signal ends CP and CN. A grounding end of the frequency dividing unit DIV and a grounding end of the buffer BUF are both connected with a grounding signal end VS.

The interpolator comprises a plurality of interpolation units INTP and corresponding buffers BUF of the same number. Each input end of the interpolation units INTP is connected with an output end of the buffers BUF in the frequency divider. Each output end of the interpolation units INTP is respectively connected with an input end of the corresponding buffer BUF in the interpolator. Each interpolation unit INTP and each buffer BUF are both connected with the pair of biasing signal ends CP and CN, the electrical source signal end VD, and the grounding signal end VS. The phase equalizer comprises a plurality of mixers MIXER and a plurality of buffers BUF correspondingly connected with each output end of the mixers MIXER. Each input end of the mixers MIXER is connected with the output end of the corresponding buffer BUF in the interpolator. Each output end of the mixers MIXER is connected with the input end of another mixer MIXER, so as to form a feedback. The combinational logic circuit comprises a logic unit LOGIC. An input end of the logic unit LOGIC is connected with each of the output ends of the buffers BUF in the interpolator. An output end of the logic unit LOGIC is connected with the pair of differential clock signal output ends CKOP and CKON.

According to the preferred embodiment, suppose a single phase clock of two multiplied frequency is to be obtained by the frequency multiplier system, the number of the interpolation units INTP and the buffers BUF in the interpolator is respectively four, the number of the mixers MIXER and the buffers BUF in the phase equalizer is respectively four, as shown in FIG. 2. Accordingly, a working principle of the frequency multiplier system is as follows: the clock signal input end CLKIN inputs a clock to the frequency divider, the frequency divider divides the inputted clock by two, so as to obtain a two-phases orthogonal clock having a frequency that is a half of the inputted clock, i.e., clock having phases of 0 degree and 90 degrees, and outputs to the interpolator. The interpolator is adopted to obtain a four-phases clock which is necessary to synthesizing phases, i.e., of phases of 0 degrees, 45 degrees, 90 degrees, and 135 degrees, and outputted to the phase equalizer. The phase equalizer is obtained to optimize relative time delay of clocks of different phases in the four-phases clock outputted by the interpolator, in such a manner that the relative time delay in the four-phases clock maintains consistent, and output the optimized four-phases clock to the combinational logic circuit. The combinational logic circuit converts and synthesizes the four-phases clock into a single phase clock of two multiplied frequency, and outputs to the clock signal output end CLKOUT, so as to realize obtaining a single phase clock of two multiplied frequency through the frequency multiplier system.

Suppose a single phase clock of N multiplied frequency is to be obtained by the frequency multiplier system, the number of the interpolation units INTP and the buffers BUF in the interpolator is respectively 2N, the number of the mixers MIXER and the buffers BUF in the phase equalizer is respectively 2N.

Figure 3:
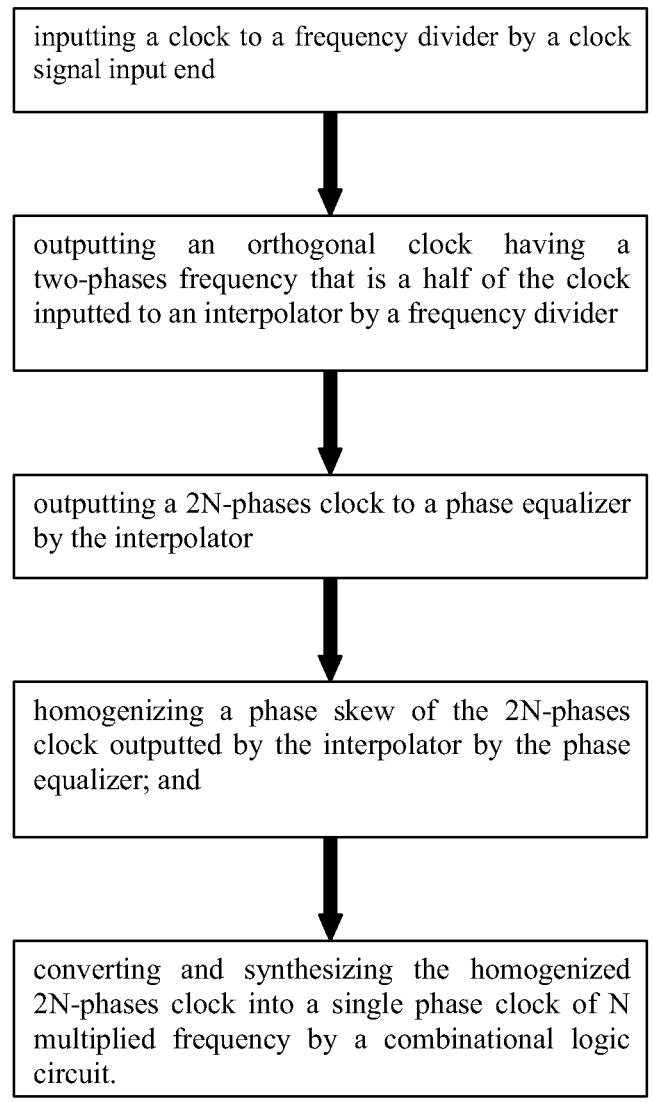
FIG. 3 is a flow chart of a method of multiplying frequency according to a preferred embodiment of the present invention.

Referring to FIG. 3 of the drawings, a method of multiplying frequency according to a preferred embodiment of the present invention comprises the steps of:

inputting a clock to a frequency divider by a clock signal input end CLKIN;

outputting an orthogonal clock having a two-phases frequency that is a half of the clock inputted to an interpolator by the frequency divider outputting a 2N-phases clock to a phase equalizer by the interpolator;

homogenizing a phase skew of the 2N-phases clock outputted by the interpolator, and outputting to a combinational logic circuit by the phase equalizer; and converting and synthesizing the homogenized 2N-phases clock into a single phase clock of N multiplied frequency, and outputting to the clock signal output end CLKOUT by the combinational logic circuit.

The frequency multiplier system and the method of multiplying frequency according to the present invention adopts the interpolator to obtain the multiple phases clock which is necessary to synthesizing phases, and optimizes the relative time delay of clocks of different phases by the phase equalizer, so as to obtain a high frequency clock. The present invention does not need feedback circuits, and therefore the frequency multiplier system and the method of multiplying frequency is stable and fast-speed, saves area, and reduces energy consumption.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A frequency multiplier system, for outputting a single phase clock of N multiplied frequency after processing an inputted clock, $N>=2$, comprising: a frequency divider receiving the inputted clock, an interpolator connected with the frequency divider, a phase equalizer connected with the interpolator, and a combinational logic circuit connected with the phase equalizer, wherein the frequency divider outputs an orthogonal clock having a two-phases frequency that is a half of the inputted clock to the interpolator, the interpolator outputs a 2N-phases clock to the phase equalizer, the phase equalizer homogenizes a phase skew of the 2N-phases clock, the combinational logic circuit synthesizes the homogenized 2N-phases clock into a single phase clock of N multiplied frequency, wherein the interpolator comprises a plurality of interpolation units INTP and corresponding buffers BUF of the same number, each input end of the interpolation units INTP is connected with an output end of the buffers BUF in the frequency divider, each output end of the interpolation units INTP is respectively connected with an input end of the corresponding buffer BUF in the interpolator, wherein the phase equalizer comprises a plurality of mixers MIXER and a plurality of buffers BUF correspondingly connected with each output end of the mixers MIXER, each input end of the mixers MIXER is connected with the output end of the corresponding buffer BUF in the interpolator, each output end of the mixers MIXER is connected with the input end of another mixer MIXER, so as to form a feedback, wherein supposing a single phase clock of N multiplied frequency is to be obtained by the frequency multiplier system, the number of the interpolation units INTP and the buffers BUF in the interpolator is respectively 2N, the number of the mixers MIXER and the buffers BUF in the phase equalizer is respectively 2N.

2. The frequency multiplier system, as recited in claim 1, further comprising a clock signal input end connected with the frequency divider, and a clock signal output end connected with the combinational logic circuit, wherein the inputted clock is inputted by the clock signal input end, the single phase clock of N multiplied frequency is outputted by the clock signal output end.

3. The frequency multiplier system, as recited in claim 1, wherein the two-phases orthogonal clock outputted by the frequency divider has phases of 0 degree and 90 degrees.

4. The frequency multiplier system, as recited in claim 1, wherein the 2N-phases clock outputted by the interpolator has phases of 0 degree, Π/2N degrees, 2Π/2N degrees, 3Π/2N degrees to (2N−1)Π/2N degrees.

5. The frequency multiplier system, as recited in claim 1, wherein the combinational logic circuit has symmetrical logic circuit structure, for converting and synthesizing the 2N-phases clock into the single phase clock of N multiplied frequency.

6. A method of multiplying frequency, comprising:
receiving an inputted clock, and outputting an orthogonal clock having a two-phases frequency that is a half of the inputted clock to an interpolator by a frequency divider;
outputting a 2N-phases clock to a phase equalizer by the interpolator, N>=2;
homogenizing a phase skew of the 2N-phases clock, and outputting to a combinational logic circuit by the phase equalizer; and
synthesizing the homogenized 2N-phases clock into a single phase clock of N multiplied frequency by the combinational logic circuit,
wherein the interpolator comprises a plurality of interpolation units INTP and corresponding buffers BUF of the same number, each input end of the interpolation units INTP is connected with an output end of the buffers BUF in the frequency divider, each output end of the interpolation units INTP is respectively connected with an input end of the corresponding buffer BUF in the interpolator,
wherein the phase equalizer comprises a plurality of mixers MIXER and a plurality of buffers BUF correspondingly connected with each output end of the mixers MIXER, each input end of the mixers MIXER is connected with the output end of the corresponding buffer BUF in the interpolator, each output end of the mixers MIXER is connected with the input end of another mixer MIXER, so as to form a feedback,
wherein supposing a single phase clock of N multiplied frequency is to be obtained by the frequency multiplier system, the number of the interpolation units INTP and the buffers BUF in the interpolator is respectively 2N, the number of the mixers MIXER and the buffers BUF in the phase equalizer is respectively 2N.

7. The method, as recited in claim 6, wherein the two-phases orthogonal clock outputted by the frequency divider has phases of 0 degree and 90 degrees.

8. The method, as recited in claim 6, wherein the 2N-phases clock outputted by the interpolator has phases of 0 degree, Π/2N degrees, 2Π/2N degrees, 3Π/2N degrees to (2N−1)Π/2N degrees.

9. The method, as recited in claim 6, wherein the combinational logic circuit has symmetrical logic circuit structure, for converting and synthesizing the 2N-phases clock into the single phase clock of N multiplied frequency.

* * * * *